United States Patent
Chuang

(10) Patent No.: US 10,098,063 B2
(45) Date of Patent: Oct. 9, 2018

(54) BASE STATIONS, MOBILE COMMUNICATION DEVICES, AND CONNECTION MAINTENANCE METHODS FOR CONNECTED MODE EXTENDED DISCONTINUOUS RECEPTION (EDRX)

(71) Applicant: Acer Incorporated, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/356,754

(22) Filed: Nov. 21, 2016

(65) Prior Publication Data
US 2017/0318527 A1   Nov. 2, 2017

(30) Foreign Application Priority Data
Apr. 27, 2016   (TW) .............................. 105113053 A

(51) Int. Cl.
  *H04W 52/02* (2009.01)
  *H04W 36/00* (2009.01)
  *H04W 72/04* (2009.01)
(52) U.S. Cl.
  CPC ... *H04W 52/0206* (2013.01); *H04W 36/0061* (2013.01); *H04W 36/0072* (2013.01); *H04W 52/0216* (2013.01); *H04W 52/0254* (2013.01); *H04W 72/048* (2013.01); *Y02D 70/1224* (2018.01); *Y02D 70/1262* (2018.01); *Y02D 70/1264* (2018.01); *Y02D 70/146* (2018.01);
(Continued)

(58) Field of Classification Search
None
See application file for complete search history.

(56) References Cited

U.S. PATENT DOCUMENTS 9,137,841 B2    9/2015  Johansson et al.
2013/0083713 A1*  4/2013  Johansson ......... H04W 52/0225
                                                            370/311

(Continued)

FOREIGN PATENT DOCUMENTS

CN        103262597 A        8/2013

OTHER PUBLICATIONS

TW Office Action dated Sep. 14, 2017 in corresponding Taiwan application (No. 105113053).

(Continued)

*Primary Examiner* — Steven H Nguyen
(74) *Attorney, Agent, or Firm* — McClure, Qualey & Rodack, LLP

(57) ABSTRACT

A base station including a wireless transceiver and a controller is provided. The wireless transceiver performs wireless transmission and reception to and from a mobile communication device operating in a connected mode extended Discontinuous Reception (eDRX). The controller determines whether a moving speed of the mobile communication device exceeds a threshold value, transmits measurement information and radio resource configurations of one or more neighboring cells to the mobile communication device via the wireless transceiver when the moving speed exceeds the threshold value, and activates radio resources of the neighboring cells for an upcoming eDRX-ON duration of the mobile communication device.

8 Claims, 6 Drawing Sheets

(52) U.S. Cl.
CPC ............ *Y02D 70/164* (2018.01); *Y02D 70/21* (2018.01); *Y02D 70/24* (2018.01)

(56) References Cited

U.S. PATENT DOCUMENTS

| | | | |
|---|---|---|---|
| 2013/0084869 A1* | 4/2013 | Johansson | H04W 76/04 455/436 |
| 2013/0210422 A1* | 8/2013 | Pani | H04W 48/16 455/423 |
| 2014/0133465 A1* | 5/2014 | Johansson | H04W 24/04 370/332 |
| 2014/0247742 A1 | 9/2014 | Lee et al. | |
| 2015/0055448 A1* | 2/2015 | Lee | H04B 7/26 370/216 |
| 2015/0215830 A1* | 7/2015 | Dalsgaard | H04W 36/0094 455/444 |
| 2015/0373598 A1* | 12/2015 | Tsuboi | H04W 16/32 370/331 |
| 2017/0048772 A1* | 2/2017 | Gheorghiu | H04W 36/14 |
| 2017/0055192 A1* | 2/2017 | Johansson | H04W 36/30 |
| 2017/0251417 A1* | 8/2017 | Lin | H04W 36/18 |

OTHER PUBLICATIONS

Search Report issued in TW Office Action dated Sep. 14, 2017 in corresponding Taiwan application (No. 105113053).

\* cited by examiner

BASE STATIONS, MOBILE COMMUNICATION DEVICES, AND CONNECTION MAINTENANCE METHODS FOR CONNECTED MODE EXTENDED DISCONTINUOUS RECEPTION (EDRX)

CROSS REFERENCE TO RELATED APPLICATIONS

This Application claims priority of Taiwan Patent Application No. 105113053, filed on Apr. 27, 2016, the entirety of which is incorporated by reference herein.

BACKGROUND OF THE APPLICATION

Field of the Application

The application generally relates to maintenance of a wireless connection, and more particularly, to apparatuses and connection maintenance methods for connected mode Extended Discontinuous Reception (eDRX).

Description of the Related Art

For a long time, various machines have been provided to make our lives more convenient in every way. Generally, machines nowadays are equipped with computing processors and software to provide users with more intelligence-based services. With the advancement of wireless communications, Machine Type Communication (MTC) has been developed to enable communications between remote machines for exchanging information and operating without human interaction. MTC sensors may be employed to monitor the operation statuses of facilities, especially for critical public infrastructures, such as water treatment facilities and bridges, and to report measurement results back to control centers via wireless communication networks using wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, High Speed Packet Access (HSPA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, and LTE-Advanced technology, etc.

Taking the LTE technology as an example: a technique called Extended Discontinuous Reception (eDRX) was first introduced for saving power in release 13 of the 3rd Generation Partnership Project (3GPP) specifications. The eDRX technique aims to extend the DRX cycle for a longer period of time, in which a Mobile Station (MS) only has to stay active for a very short time and then enters an inactive state for the rest of the time that it is in the DRX cycle. This greatly reduces the power consumption of the MS, especially when the MS is powered by a battery, and most of the time, it's hard to charge or replace the battery. For example, the standby time of an MS employing the DRX technique may be up to 5 weeks, and if the MS is configured to employ the eDRX technique instead, the standby time may be extended to several years.

However, it has not come to the attention of the 3GPP specifications, that an MTC device may very likely be mobile. That is, for a moving MTC device operating in the connected mode eDRX, the radio signal quality may change fast, and the MTC device may not be able to detect the change and report to the network in time due to the fact that it mostly stays in the inactive state. With lack of real-time measurement results from the MTC device, the network is unable to tell the MTC device to switch to a cell that can better serve the MTC device. As the radio signal quality of the serving cell continues to deteriorate, the MTC device will experience a Radio Link Failure (RLF) which further leads to connection loss and service breakoff. Thus, it is desirable to have a solution for such an MS to avoid RLF.

BRIEF SUMMARY OF THE APPLICATION

In a first aspect of the application, a base station comprising a wireless transceiver and a controller is provided. The wireless transceiver is configured to perform wireless transmission and reception to and from a mobile communication device operating in a connected mode eDRX. The controller is configured to determine whether a moving speed of the mobile communication device exceeds a threshold value, transmit measurement information and radio resource configurations of one or more neighboring cells to the mobile communication device via the wireless transceiver when the moving speed exceeds the threshold value, and activate radio resources of the neighboring cells for an upcoming eDRX-ON duration of the mobile communication device.

In a second aspect of the application, a connection maintenance method for a base station wirelessly communicating with a mobile communication device operating in a connected mode eDRX is provided. The connection maintenance method comprises the steps of: determining whether a moving speed of the mobile communication device exceeds a threshold value; transmitting measurement information and radio resource configurations of one or more neighboring cells to the mobile communication device when the moving speed exceeds the threshold value; and activating radio resources of the neighboring cells for an upcoming eDRX-ON duration of the mobile communication device.

In a third aspect of the application, a mobile communication device, operating in a connected mode eDRX is provided. The mobile communication device comprises a wireless transceiver and a controller. The wireless transceiver is configured to perform wireless transmission and reception to and from a base station. The controller is configured to receive measurement information and radio resource configurations of one or more neighboring cells from the base station via the wireless transceiver when a moving speed of the mobile communication device exceeds a threshold value, perform measurements on a serving cell and the neighboring cells via the wireless transceiver according to the measurement information of the neighboring cells, and when a result of the measurements indicates that the serving cell has poor signal quality and one of the neighboring cells has good signal quality, switch from the serving cell to the one of the neighboring cells according to the radio resource configurations of the neighboring cells.

In a fourth aspect of the application, a connection maintenance method for a mobile communication device operating in a connected mode eDRX is provided. The connection maintenance method comprises the steps of: receiving measurement information and radio resource configurations of one or more neighboring cells from a base station, when a moving speed of the mobile communication device exceeds a threshold value; performing measurements on a serving cell and the neighboring cells according to the measurement information of the neighboring cells; and switching from the serving cell to the one of the neighboring cells according to the radio resource configurations of the neighboring cells, when a result of the measurements indicates that the serving cell has poor signal quality and one of the neighboring cells has good signal quality.

Other aspects and features of the invention will become apparent to those with ordinary skill in the art upon review of the following descriptions of specific embodiments of the base stations, mobile communication devices, and connection maintenance methods.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
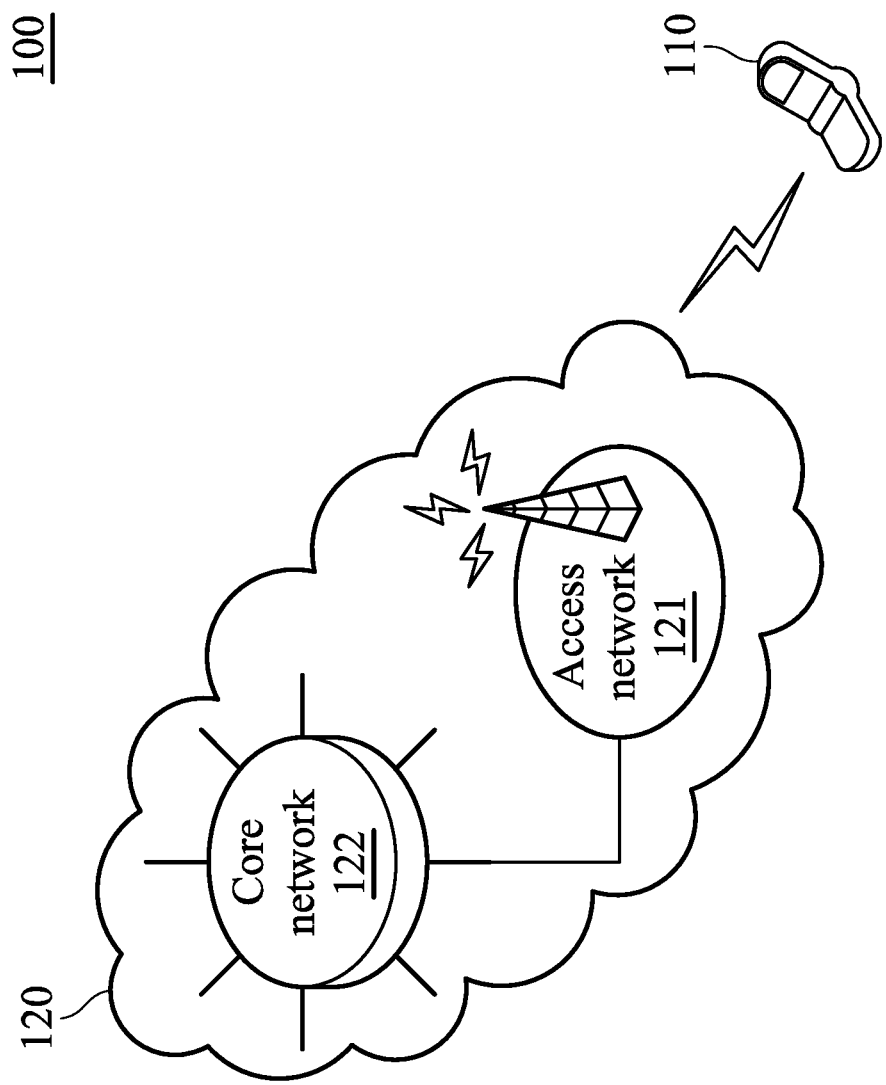
FIG. 1 is a block diagram of a wireless communication environment according to an embodiment of the application.

FIG. 1 is a block diagram of a wireless communication environment according to an embodiment of the application. The wireless communication environment 100 comprises a mobile communication device 110 and a service network 120, wherein the mobile communication device 110 is wirelessly connected to the service network 120 for obtaining mobile services, and both the mobile communication device 110 and the service network 120 support the operation of connected mode eDRX. The mobile communication device 110 may be referred to as an MS, such as a feature phone, a smartphone, a panel Personal Computer (PC), a laptop computer, an MTC sensor, or any computing device supporting the wireless technology utilized by the service network 120. In one embodiment, the mobile communication device 110 may be configured for MTC and run an application for MTC. For example, the mobile communication device 110 may be an MTC sensor employed to monitor the operation status of a certain facility, such as a water treatment facility or a bridge, or monitor biological information, such as blood pressure, body temperature, and/or heart rate of the wearer, and report measurement results back to control centers.

The service network 120 may be an LTE/LTE-A/TD-LTE network. Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, the access network 121 may be a Evolved-Universal Terrestrial Radio Access (E-UTRAN) which includes at least an evolved-NodeB (eNB), e.g., a macro eNB, femto eNB, or pico eNB, and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW), etc.

Figure 2:
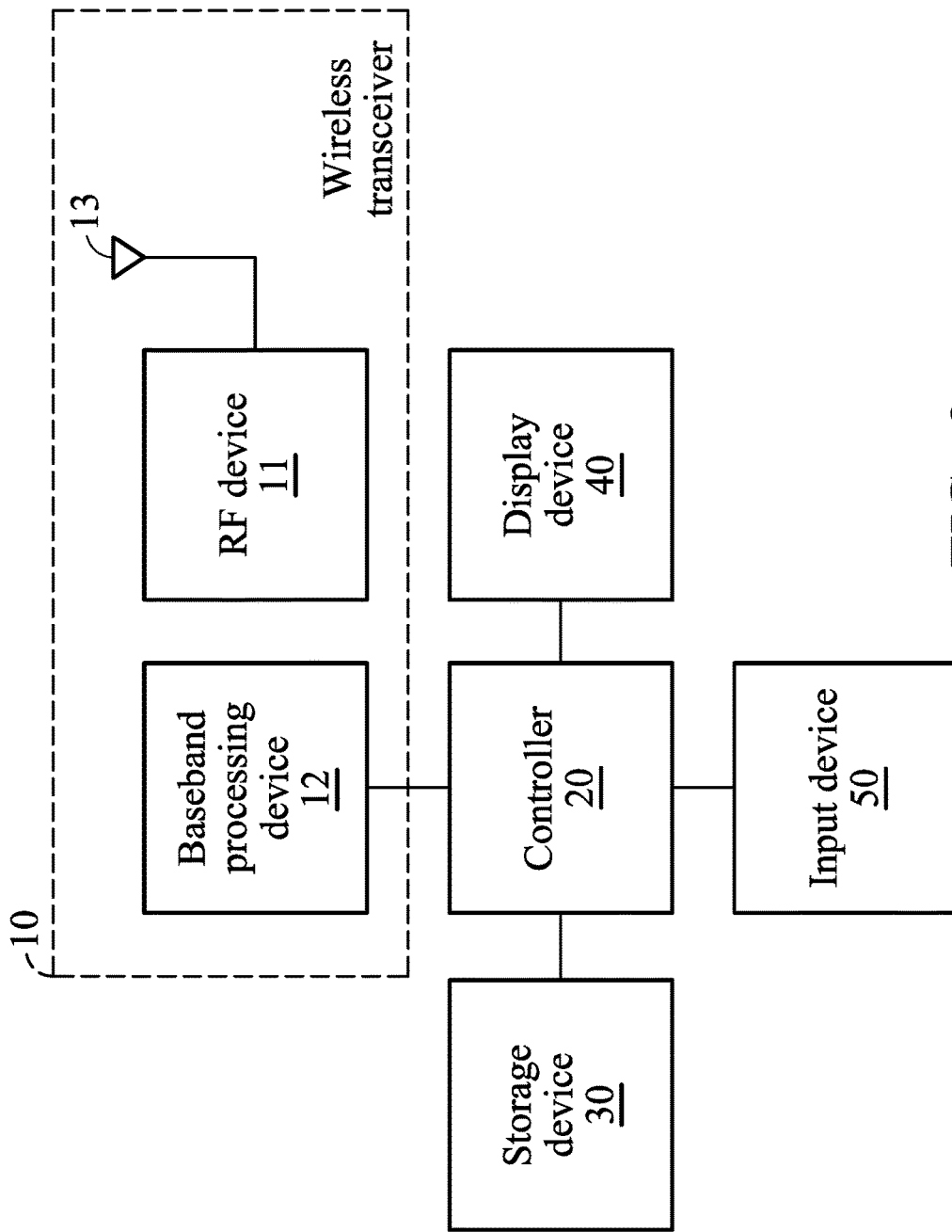
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 120. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technology, wherein the radio frequency may be 900 MHz, 2100 MHz, or 2.6 GHz utilized in the LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), or the like, which includes various circuitry for providing the function of data processing and computing, controlling the wireless transceiver 10 for wireless communications with the service network 120, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method of the present application.

As will be appreciated by persons skilled in the art, the circuitry for performing such a method will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

In another embodiment, the controller 20 may be incorporated into the baseband processing device 12, serving as a baseband processor.

The storage device 30 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 2 are for illustrative purposes only and are not intended to limit the scope of the application. For example, the mobile communication device 110 may further comprise a power supply, and/or a Global Positioning System (GPS), etc.

Figure 3:
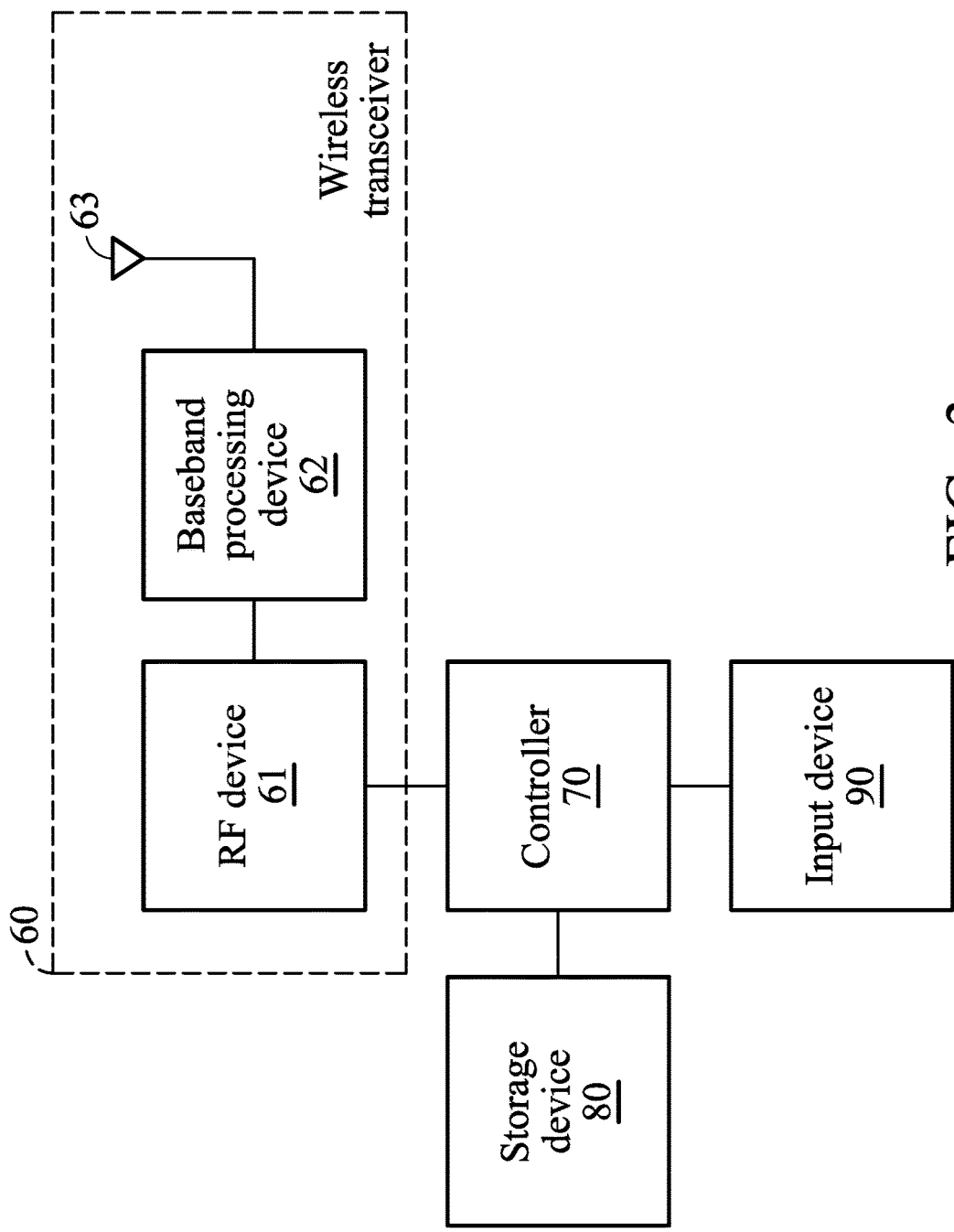
FIG. 3 is a block diagram illustrating a base station according to an embodiment of the application.

FIG. 3 is a block diagram illustrating a base station according to an embodiment of the application. The base station may refer to an eNB, e.g., a macro eNB, femto eNB, or pico eNB, of the access network 121. The base station comprises a wireless transceiver 60, a controller 70, a storage device 80, and an input device 90. The wireless transceiver 60, the storage device 80, and the input device 90 are similar to the wireless transceiver 10, the storage device 30, and the input device 50 in FIG. 2, respectively, and thus, the detailed description thereof is omitted herein for brevity.

The controller 70 may be a general-purpose processor, an MCU, an application processor, a DSP, or the like, which includes various circuitry for providing the function of data processing and computing, controlling the operation of the wireless transceiver 60 for communications with the mobile communication device 110, storing and retrieving data to and from the storage device 80, and receiving signals from the input device 90. In particular, the controller 70 coordinates the aforementioned operations of the wireless transceiver 60, the storage device 80, and the input device 90 for performing the method of the present application.

As will be appreciated by persons skilled in the art, the circuitry for performing such a method will typically include transistors that are configured in such a way as to control the operation of the circuitry in accordance with the functions and operations described herein. As will be further appreciated, the specific structure or interconnections of the transistors will typically be determined by a compiler, such as a RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

In another embodiment, the controller 70 may be incorporated into the baseband processing device 62, serving as a baseband processor.

It should be understood that the components described in the embodiment of FIG. 3 are for illustrative purposes only and are not intended to limit the scope of the application.

Figure 4:
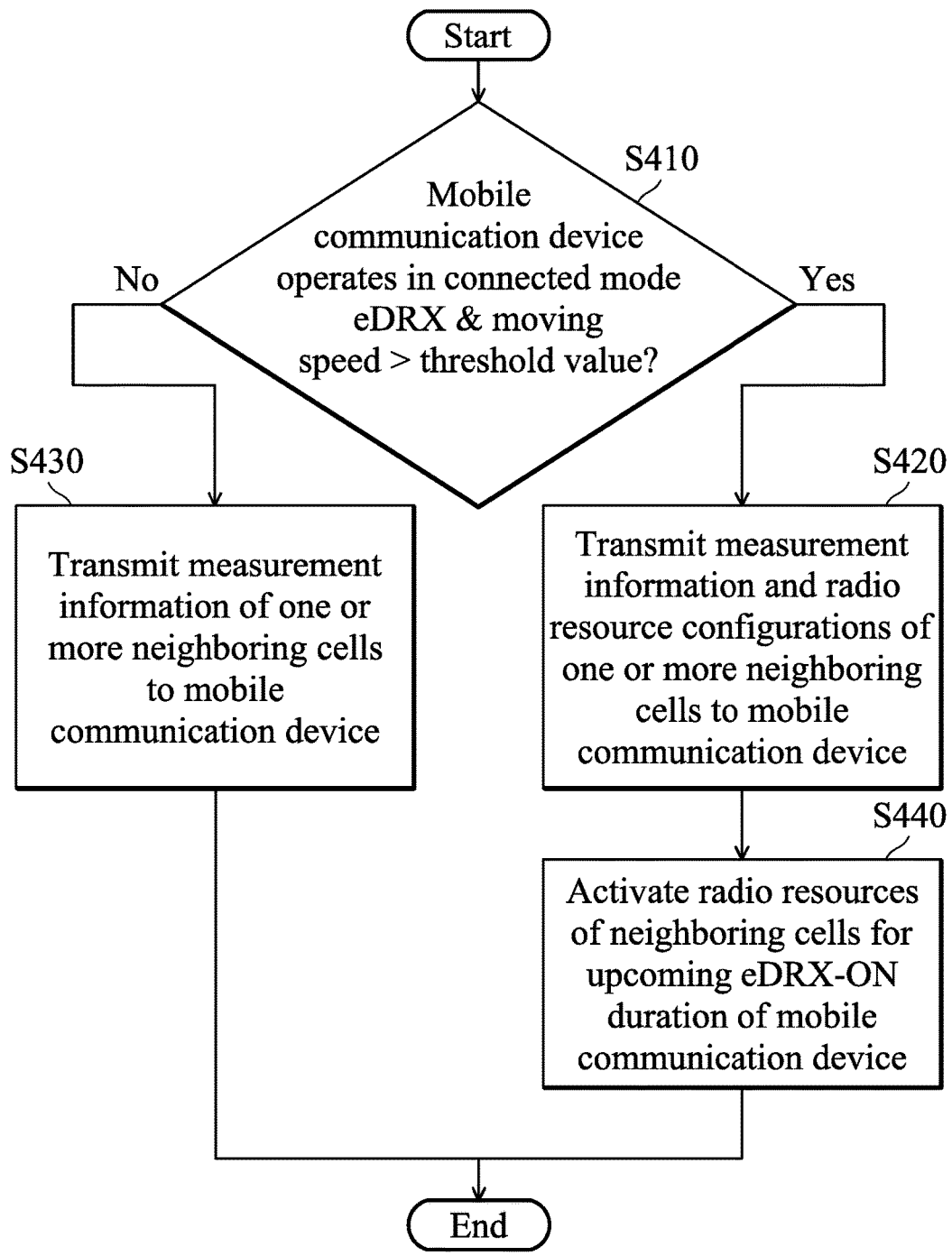
FIG. 4 is a flow chart illustrating the connection maintenance method for a base station according to an embodiment of the application.

FIG. 4 is a flow chart illustrating the connection maintenance method for a base station according to an embodiment of the application. In this embodiment, the connection maintenance method may be applied to any base station (e.g., an eNB in the access network 121) which supports the operation of connection mode eDRX. To begin, the base station determines whether a mobile communication device operates in the connected mode eDRX and the moving speed of the mobile communication device exceeds a threshold value (step S410). That is, there are three conditions of the mobile communication device for the base station to check: 1) operating in connected mode; 2) operating in eDRX; and 3) moving at an average speed or high speed. In one embodiment, the moving speed of the mobile communication device may be determined by the number of times that the mobile communication device switches cell in a period of time. For example, it may be determined that the mobile communication device is moving at an average speed when it switches cells about every 2 minutes, or that the mobile communication device is moving at a high speed when it switches cells about every 1 minute or when there are 3 incidents of cell switching every 4 minutes.

Subsequently, if the determination result in step S410 is "yes", then the base station transmits the measurement information and radio resource configurations of one or more neighboring cells to the mobile communication device (step S420). That is, the base station may selectively transmit the measurement information and radio resource configurations of all or part of the neighboring cells to the mobile communication device. Otherwise, if the determination result in step S410 is "no", then the base station transmits the measurement information of one or more neighboring cells to the mobile communication device (step S430).

In one embodiment, the measurement information and radio resource configurations of the neighboring cells may be transmitted in a Radio Resources Control (RRC) message. For example, the RRC message may be an RRC CONNECTION RECONFIGURATION message, and the measurement information and radio resource configurations of the neighboring cells may be carried in Information Elements (IEs) that have already existed or newly defined for such a purpose in the RRC CONNECTION RECONFIGURATION message.

Specifically, the measurement information of the neighboring cells may include at least one of the following: Physical Cell Identities (PCIs) of the neighboring cells, information concerning carrier frequencies of the neighboring cells, and information concerning carrier bandwidths of each of the neighboring cells. The radio resource configurations of the neighboring cells may include at least one of the following: dedicated Random Access Channel (RACH) configurations of the neighboring cells; and default common or dedicated radio resource configurations of the neighboring cells. Note that radio resource configurations of the dedicated RACH are used specifically for contention-free random access procedures, which may include the ra-preamble index, and ra-PRACH-MaskIndex.

Subsequent to step S420, the base station activates the radio resources of the neighboring cells for an upcoming eDRX-ON duration of the mobile communication device (step S440), so as to enable the mobile communication device for cell switching based on its moving status.

Figure 5:
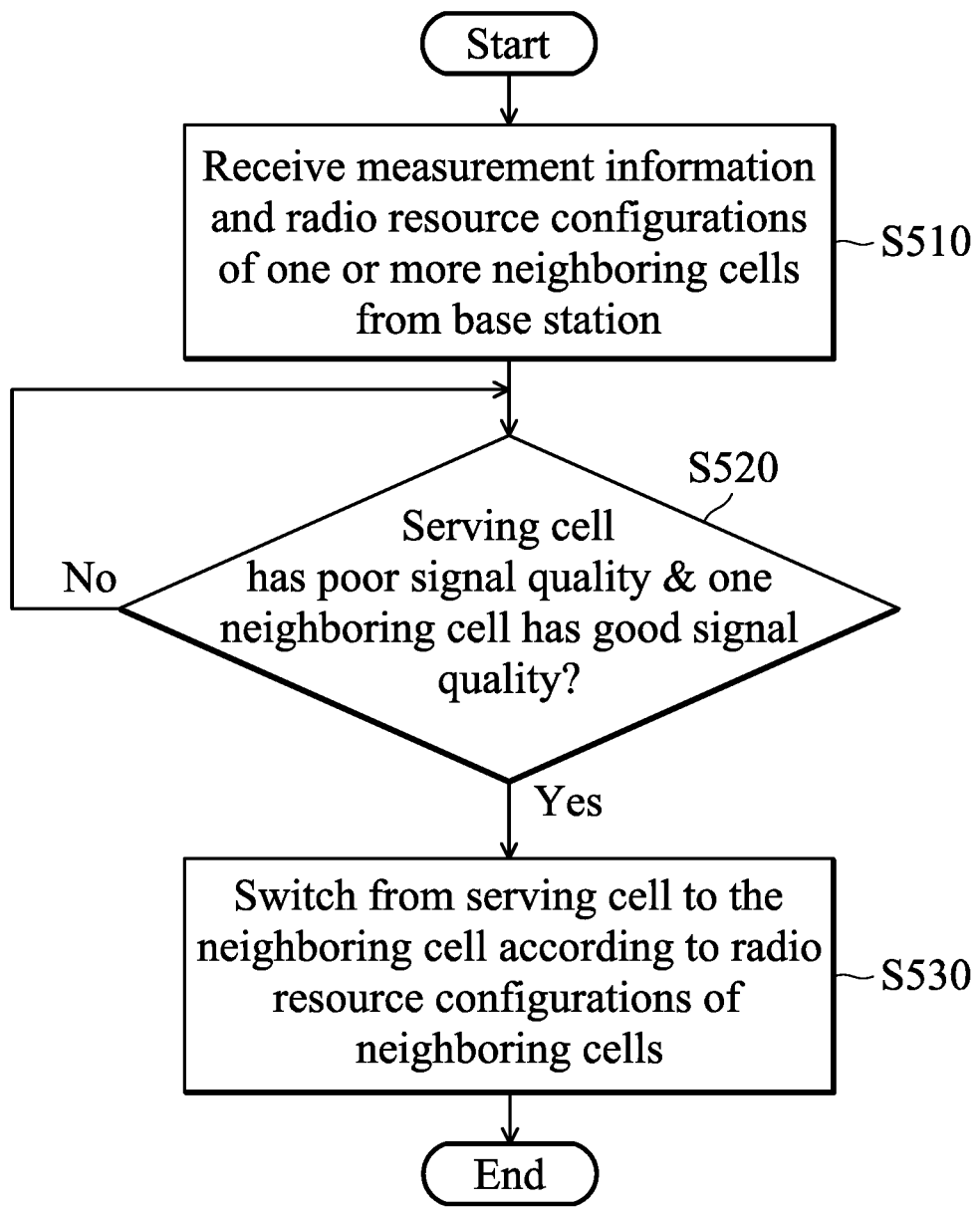
FIG. 5 is a flow chart illustrating the connection maintenance method for a mobile communication device according to an embodiment of the application.

FIG. 5 is a flow chart illustrating the connection maintenance method for a mobile communication device according to an embodiment of the application. In this embodiment, the connection maintenance method may be applied to any MS (e.g., the mobile communication device 110) which supports the operation of connection mode eDRX. To begin, the mobile communication device receives the measurement information and radio resource configurations of one or more neighboring cells from a base station, when the moving speed of the mobile communication device exceeds a threshold value (step S510).

Subsequently, the mobile communication device performs measurements on a serving cell and the neighboring cells according to the measurement information of the neighboring cells at the start of every DRX-ON duration, and determines whether the serving cell has poor signal quality and one of the neighboring cells has good signal quality according to the measurement results (step S520). If the measurement results indicate so, the mobile communication device switches from the serving cell to the one of the neighboring cells according to the radio resource configurations of the neighboring cells (step S530). If the measurement results indicate otherwise, the method flow proceeds to step S520 where the mobile communication device awaits till the next DRX-ON duration for another measurement and signal quality check.

Figure 6:
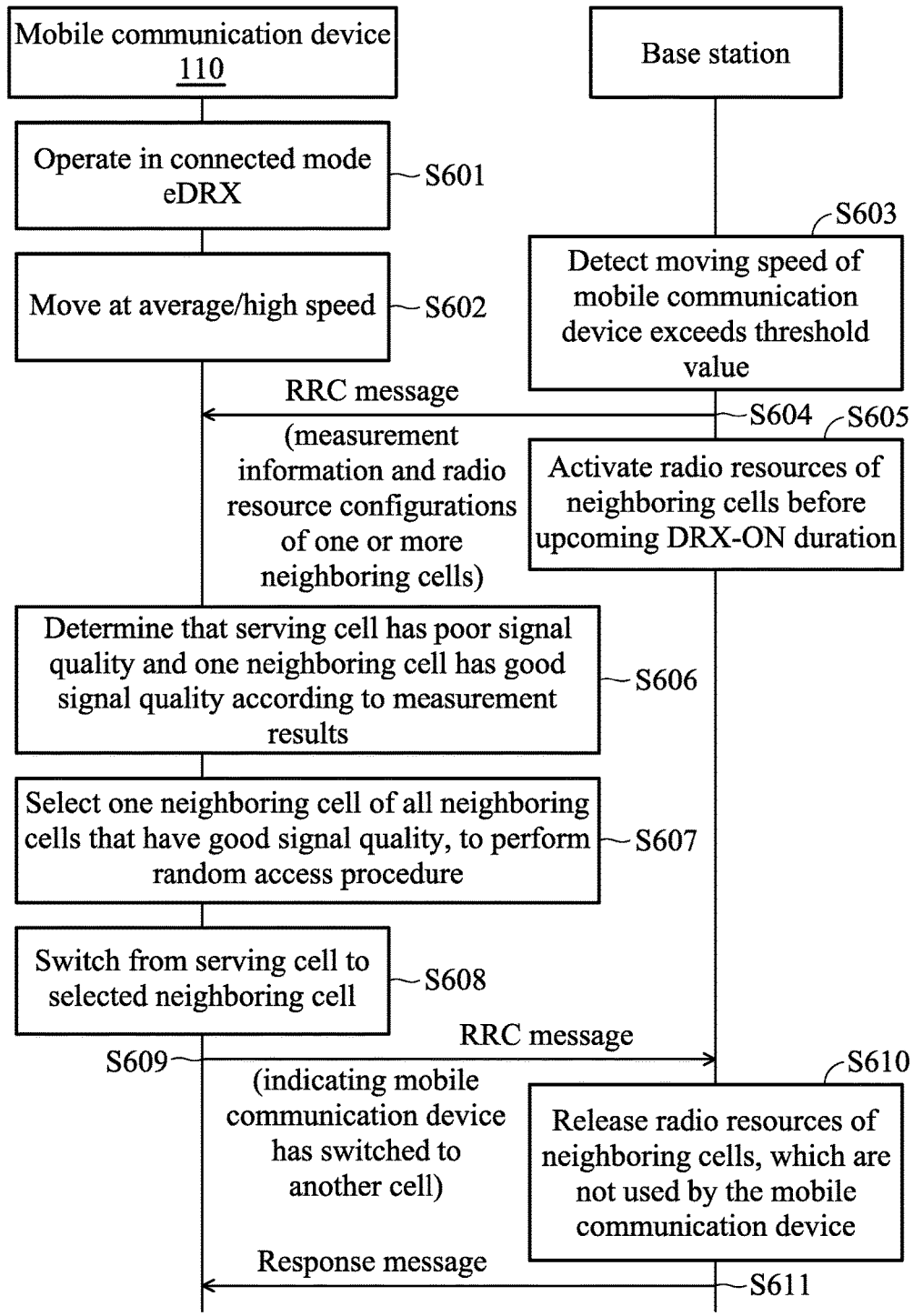
FIG. 6 is a message sequence chart illustrating the connection maintenance method for connected mode eDRX according to an embodiment of the application.

FIG. 6 is a message sequence chart illustrating the connection maintenance method for connected mode eDRX according to an embodiment of the application. To begin, the mobile communication device 110 is configured to operate in connected mode eDRX (step S601), and moves at an average or high speed (i.e., its moving speed exceeds a threshold value) (step S602). Next, the base station detects that the moving speed of the mobile communication device 110 exceeds the threshold value (step S603), and transmits the measurement information and radio resource configurations of one or more neighboring cells to the mobile communication device 110 through an RRC message (step S604). As described in the embodiment of FIG. 4, the RRC message may be an RRC CONNECTION RECONFIGURATION message, and detailed description thereof is omitted herein for brevity.

Subsequently, the base station activates the radio resources of the neighboring cells before an upcoming DRX-ON duration (step S605). In the DRX-ON duration, the mobile communication device 110 performs measurements on a serving cell and the neighboring cells according to the measurement information of the neighboring cells, and determines that the serving cell has poor signal quality and at least one of the neighboring cells has good signal quality according to the measurement results (step S606). The mobile communication device 110 selects one neighboring cell among the neighboring cells that have good signal quality, and performs the random access procedure in the selected neighboring cell (step S607). Next, the mobile communication device 110 switches from the serving cell to the selected neighboring cell (step S608). In one embodiment, the selected neighboring cell in step S607 is the one with the best signal quality of all the neighboring cells.

After switching to the selected neighboring cell, the mobile communication device 110 transmits another RRC message to the base station to indicate that it has switched to another cell (step S609). When receiving the RRC message, the base station releases the radio resources of the neighboring cells, which are not used by the mobile communication device 110 (step S610), and then transmits a response message to the mobile communication device 110 (step S611), and the method ends.

In another embodiment, the base station may start a timer when activating the radio resources of the neighboring cells, and when the timer expires, release the radio resources of the neighboring cells, which are not used by the mobile communication device 110.

In view of the foregoing embodiments of FIGS. 4-6, it will be appreciated that the present application realizes an improved connection stability for the MS operating in connected mode eDRX and moving at an average/high speed, by allowing the base station to proactively notify the MS about the measurement information and radio resource configurations of the neighboring cells and to activate the radio resources of the neighboring cells for the upcoming DRX-ON duration of the MS. Advantageously, the MS may be able to switch to a more suitable cell as soon as possible based on its moving status, and thus, the occurrence of RLF may be avoided.

Please note that for detailed description of the random access procedure and cell switching in the embodiment of FIG. 6, reference may be made to the 3GPP TS 36.331, release 13.

While the application has been described by way of example and in terms of preferred embodiment, it is to be understood that the application is not limited thereto. Those who are skilled in this technology can still make various alterations and modifications without departing from the scope and spirit of this application. Therefore, the scope of the application shall be defined and protected by the following claims and their equivalents.

What is claimed is:

1. A mobile communication device, operating in a connected mode extended Discontinuous Reception (eDRX), comprising:
   a wireless transceiver, configured to perform wireless transmission and reception to and from a base station; and
   a controller, configured to receive measurement information and radio resource configurations of one or more neighboring cells from the base station via the wireless transceiver when a moving speed of the mobile communication device exceeds a threshold value, perform measurements on a serving cell and the neighboring cells via the wireless transceiver according to the measurement information of the neighboring cells, and when a result of the measurements indicates that the serving cell has poor signal quality and one of the neighboring cells has good signal quality, switch from the serving cell to the one of the neighboring cells according to the radio resource configurations of the neighboring cells;
   wherein the radio resource configurations of the neighboring cells comprise dedicated Random Access Channel (RACH) configurations comprising a ra-preamble index and a ra-PRACH-MaskIndex.

2. The mobile communication device of claim 1, wherein the controller is further configured to transmit a Radio Resources Control (RRC) message to the base station via the wireless transceiver, which indicates that the mobile communication device has switched from the serving cell to the one of the neighboring cells.

3. The mobile communication device of claim 1, wherein the measurement information of the neighboring cells comprises at least one of the following:
   Physical Cell Identities (PCIs) of the neighboring cells;
   information concerning carrier frequencies of the neighboring cells; and
   information concerning carrier bandwidths of each of the neighboring cells.

4. The mobile communication device of claim 1, wherein the radio resource configurations of the neighboring cells further comprise:
   default common or dedicated radio resource configurations of the neighboring cells.

5. A connection maintenance method for a mobile communication device operating in a connected mode extended Discontinuous Reception (eDRX), the connection maintenance method comprising:
   receiving measurement information and radio resource configurations of one or more neighboring cells from a base station, when a moving speed of the mobile communication device exceeds a threshold value, wherein the radio resource configurations of the neighboring cells comprise dedicated Random Access Channel (RACH) configurations comprising a ra-preamble index and a ra-PRACH-MaskIndex;
   performing measurements on a serving cell and the neighboring cells according to the measurement information of the neighboring cells; and
   switching from the serving cell to the one of the neighboring cells according to the radio resource configurations of the neighboring cells, when a result of the measurements indicates that the serving cell has poor signal quality and one of the neighboring cells has good signal quality.

6. The connection maintenance method of claim 5, further comprising:
   transmitting a Radio Resources Control (RRC) message to the base station, which indicates that the mobile communication device has switched from the serving cell to the one of the neighboring cells.

7. The connection maintenance method of claim 5, wherein the measurement information of the neighboring cells comprises at least one of the following:
   Physical Cell Identities (PCIs) of the neighboring cells;
   information concerning carrier frequencies of the neighboring cells; and
   information concerning carrier bandwidths of each of the neighboring cells.

8. The connection maintenance method of claim 5, wherein the radio resource configurations of the neighboring cells further comprise:
   default common or dedicated radio resource configurations of the neighboring cells.

* * * * *